US012619466B2

(12) United States Patent    (10) Patent No.:    US 12,619,466 B2
Perraut et al.    (45) Date of Patent:    May 5, 2026

(54) SYSTEM AND METHOD FOR GENERATING CONSOLIDATED RESOURCE ACCESS CONTROL DATA IN AN ELECTRONIC NETWORK

(71) Applicant: BANK OF AMERICA CORPORATION, Charlotte, NC (US)

(72) Inventors: Trina Perraut, Fairview, TX (US); Jason Lee Harris, Charlotte, NC (US); Kara M. Schlageter, Charlotte, NC (US); Sudhinder Baru, Flemington, NJ (US); David Dee Middleton, Jr., Chicago, IL (US); Nathaniel Clark, Wheaton, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 546 days.

(21) Appl. No.: 18/102,502

(22) Filed: Jan. 27, 2023

(65)          Prior Publication Data
US 2024/0256338 A1    Aug. 1, 2024

(51) Int. Cl.
*G06F 9/50*          (2006.01)
(52) U.S. Cl.
CPC .................................. *G06F 9/5027* (2013.01)
(58) Field of Classification Search
None
See application file for complete search history.

(56)          References Cited

U.S. PATENT DOCUMENTS

| | | | |
|---|---|---|---|
| 9,432,247 | B2 | 8/2016 | Arwe et al. |
| 9,912,549 | B2 | 3/2018 | Rieke |
| 10,511,637 | B2 | 12/2019 | Dicorpo et al. |
| 10,659,335 | B1 | 5/2020 | Morris |
| 10,791,384 | B2 | 9/2020 | Adiletta et al. |
| 11,252,168 | B2 | 2/2022 | Mehta et al. |
| 11,417,131 | B2 | 8/2022 | Malak et al. |
| 11,444,855 | B2 | 9/2022 | Naik et al. |
| 11,470,110 | B2 | 10/2022 | Margel et al. |
| 11,756,012 | B2 * | 9/2023 | Caraccioli .............. G06Q 20/12 |
| | | | 705/44 |

(Continued)

FOREIGN PATENT DOCUMENTS

| | | | | |
|---|---|---|---|---|
| CN | 109299068 | A | * | 2/2019 ............. G06F 16/21 |
| CN | 111125215 | A | * | 5/2020 ......... G06F 16/2282 |

(Continued)

*Primary Examiner* — Charles E Anya
(74) *Attorney, Agent, or Firm* — Moore & Van Allen PLLC; Anoohya Yarlagadda

(57)          ABSTRACT
Embodiments of the present invention provide a system for generating consolidated resource access control data in an electronic network. The system is configured for identifying one or more entity resources associated with an entity, gathering access characteristics associated with the one or more entity resources from one or more third party entity systems, consolidating the access characteristics gathered from the one or more third party entity systems, parsing the consolidated access characteristics, via a data parsing application, to generate parsed data, auto-populating a matrix in a storage system based on the parsed data, and generating resource access control data associated with the one or more entity resources and the one or more third party entity systems based on auto-populated data from the matrix.

17 Claims, 5 Drawing Sheets

(56)                    References Cited

U.S. PATENT DOCUMENTS

| | | | |
|---|---|---|---|
| 2008/0083025 A1 * | 4/2008 | Meijer | H04L 63/0807 |
| | | | 726/9 |
| 2008/0228920 A1 * | 9/2008 | Souders | H04L 67/568 |
| | | | 709/226 |
| 2008/0312898 A1 | 12/2008 | Cleary et al. | |
| 2008/0320560 A1 * | 12/2008 | Casey | H04L 63/10 |
| | | | 726/3 |
| 2011/0296519 A1 | 12/2011 | Ide et al. | |
| 2018/0191767 A1 | 7/2018 | Habib et al. | |
| 2019/0102389 A1 * | 4/2019 | LeGault | G06F 16/282 |
| 2019/0138538 A1 | 5/2019 | Stojanovic et al. | |
| 2019/0182291 A1 | 6/2019 | Doron et al. | |
| 2019/0287168 A1 * | 9/2019 | Williams, III | G06F 16/2457 |
| 2021/0056184 A1 * | 2/2021 | Modani | G06F 21/44 |
| 2021/0119937 A1 * | 4/2021 | Lillie | H04L 47/828 |
| 2021/0142249 A1 * | 5/2021 | Ellsworth | G06N 20/10 |
| 2021/0256783 A1 * | 8/2021 | Davis | G07C 9/28 |
| 2022/0121708 A1 | 4/2022 | Burnett et al. | |
| 2022/0329473 A1 | 10/2022 | Faircloth et al. | |
| 2023/0412605 A1 * | 12/2023 | Maladwalla | H04L 63/104 |

FOREIGN PATENT DOCUMENTS

| | | | | | |
|---|---|---|---|---|---|
| CN | 112559606 A | * | 3/2021 | | G06F 16/258 |
| KR | 102157336 B1 | * | 9/2020 | | G06F 16/21 |
| WO | WO 2015168936 A1 | * | 11/2015 | | H04L 9/40 |

* cited by examiner

THIRD PARTY
SYSTEMS
201

ENTITY
SYSTEM
200

100

NETWORK
150

ACCESS CONTROL DATA
GENERATION SYSTEM
300

COMPUTING
DEVICE
SYSTEM
400

USER
110

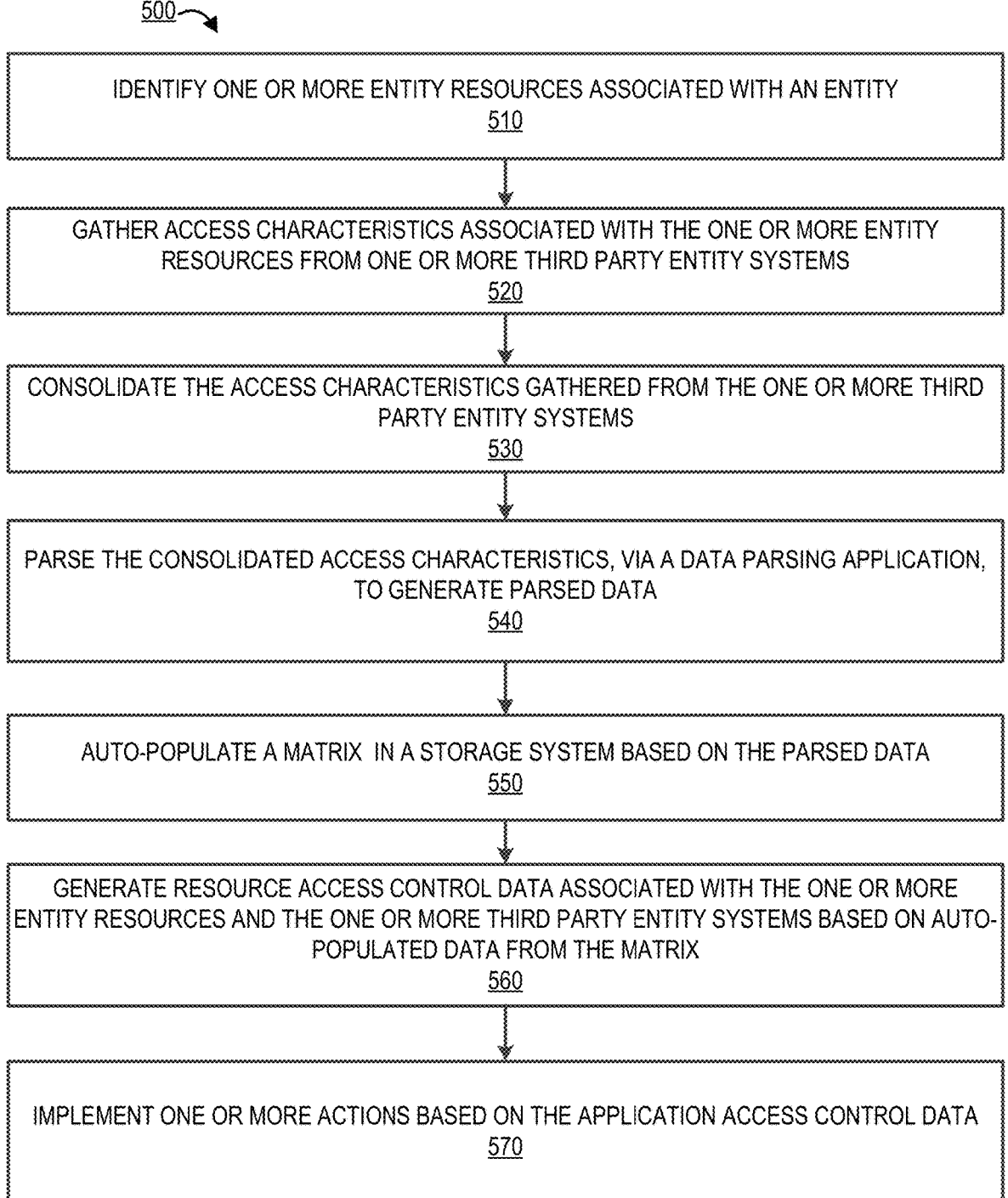

500

IDENTIFY ONE OR MORE ENTITY RESOURCES ASSOCIATED WITH AN ENTITY
510

GATHER ACCESS CHARACTERISTICS ASSOCIATED WITH THE ONE OR MORE ENTITY
RESOURCES FROM ONE OR MORE THIRD PARTY ENTITY SYSTEMS
520

CONSOLIDATE THE ACCESS CHARACTERISTICS GATHERED FROM THE ONE OR MORE THIRD
PARTY ENTITY SYSTEMS
530

PARSE THE CONSOLIDATED ACCESS CHARACTERISTICS, VIA A DATA PARSING APPLICATION,
TO GENERATE PARSED DATA
540

AUTO-POPULATE A MATRIX  IN A STORAGE SYSTEM BASED ON THE PARSED DATA
550

GENERATE RESOURCE ACCESS CONTROL DATA ASSOCIATED WITH THE ONE OR MORE
ENTITY RESOURCES AND THE ONE OR MORE THIRD PARTY ENTITY SYSTEMS BASED ON AUTO-
POPULATED DATA FROM THE MATRIX
560

IMPLEMENT ONE OR MORE ACTIONS BASED ON THE APPLICATION ACCESS CONTROL DATA
570

*FIG. 5*

SYSTEM AND METHOD FOR GENERATING CONSOLIDATED RESOURCE ACCESS CONTROL DATA IN AN ELECTRONIC NETWORK

BACKGROUND

There exists a need for a system that generates consolidated resource access control data in an electronic network.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generating consolidated resource access control data in an electronic network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more entity resources associated with an entity, gathers access characteristics associated with the one or more entity resources from one or more third party entity systems, consolidates the access characteristics gathered from the one or more third party entity systems, parsing the consolidated access characteristics, via a data parsing application, to generate parsed data, auto-populates a matrix in a storage system based on the parsed data, and generates resource access control data associated with the one or more entity resources and the one or more third party entity systems based on auto-populated data from the matrix.

In some embodiments, the present invention receives the access characteristics from the one or more third party systems in a JSON format.

In some embodiments, parsing the consolidated access characteristics comprises converting the consolidated access characteristics from JSON format to a storage format accepted by the storage system.

In some embodiments, the matrix is a database table.

In some embodiments, the present invention generates the resource access control data, wherein the resource access control data comprises at least one of type of access, classification of the access existence of privilege, and provisioning information.

In some embodiments, the present invention implements one or more actions based on the resource access control data, wherein the one or more actions comprise at least one of revoking pre-authorized access to the one or more entity resources, granting access to the one or more entity resources, and revising existing access to the one or more entity resources.

In some embodiments, the present invention automatically transmits the resource access control data to one or more entity systems associated with the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
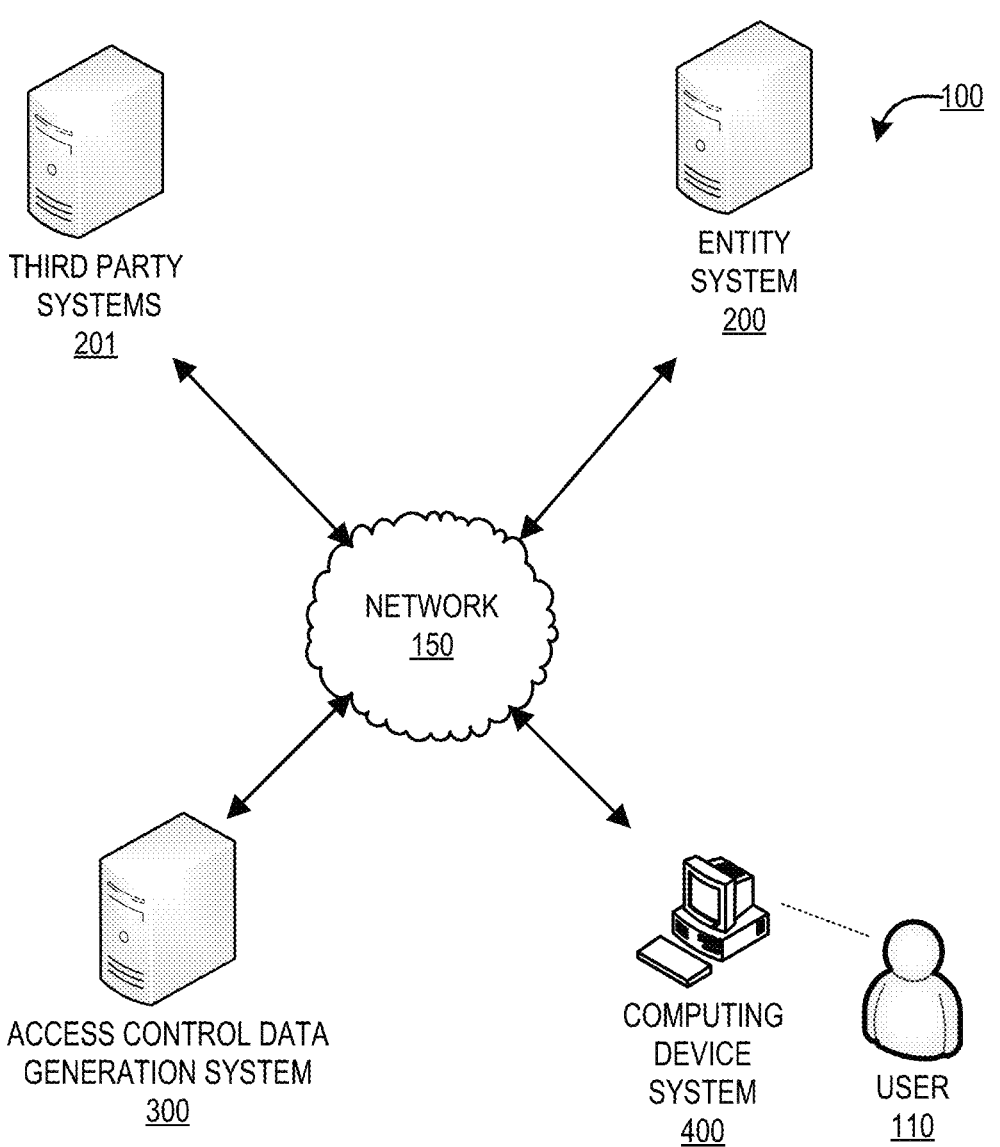
Figure 2:
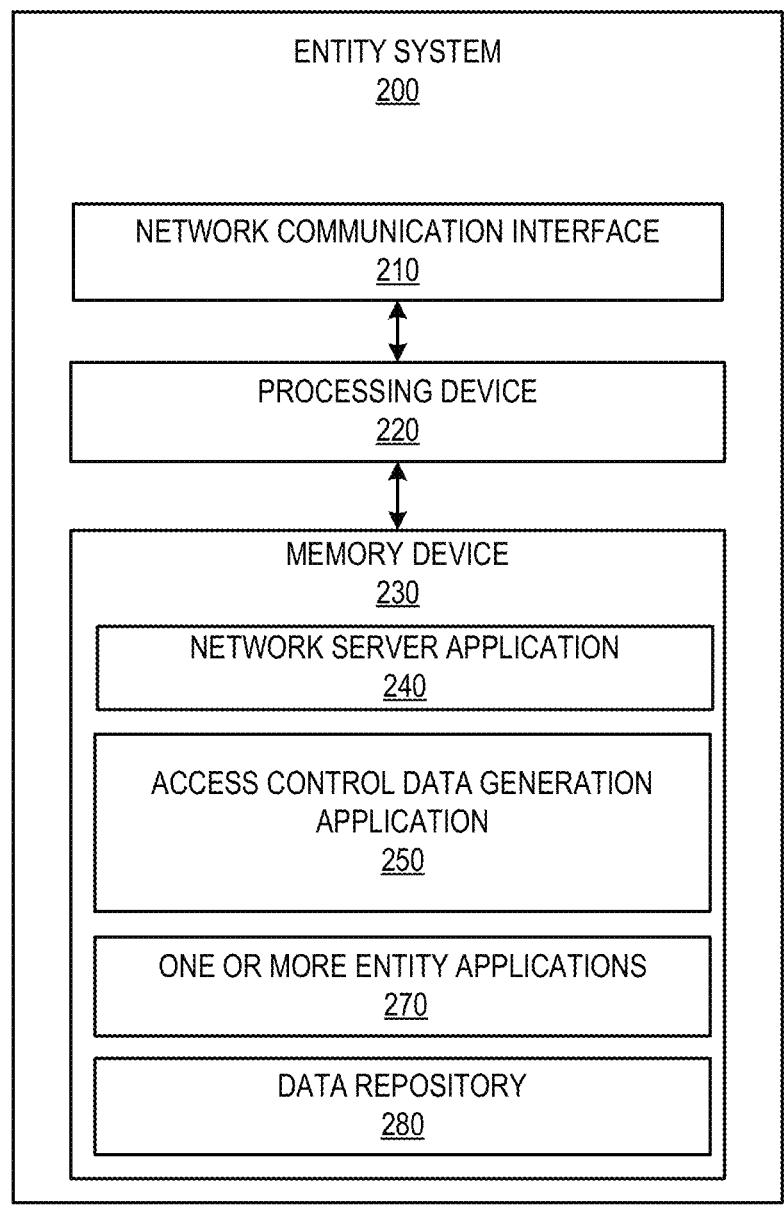
Figure 3:
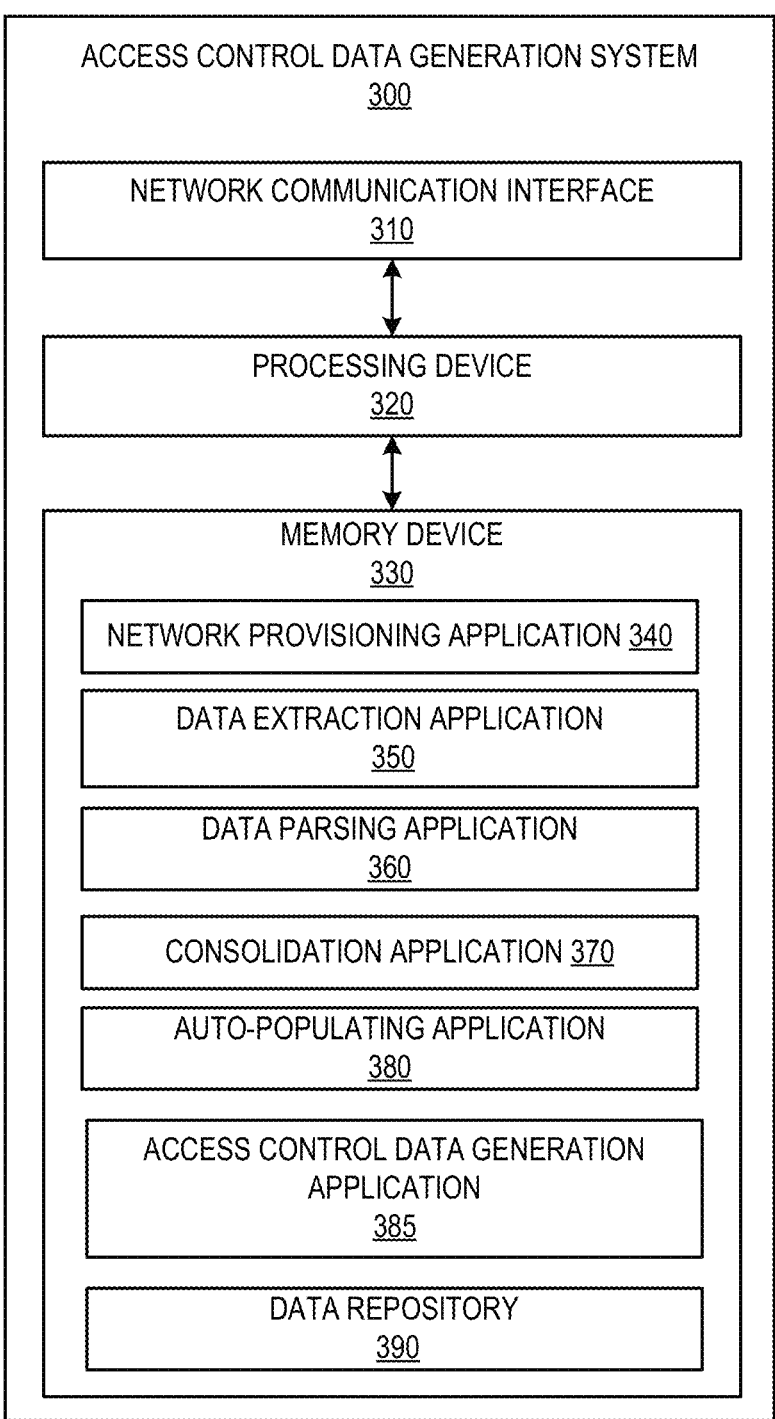
Figure 4:
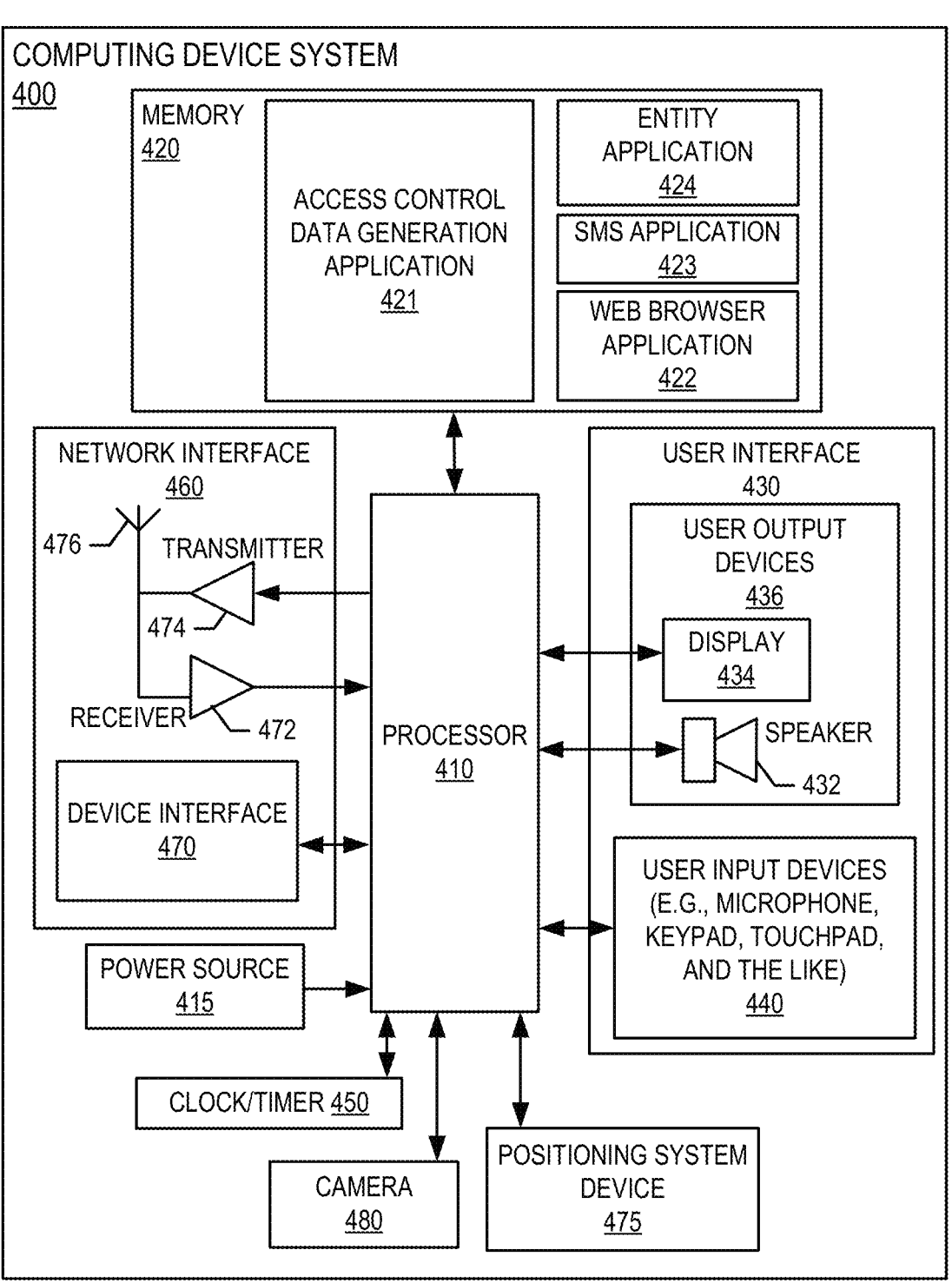

Having thus described embodiments of the invention in general terms, reference will now be made the accompanying drawings, wherein:

FIG. 1 provides a block diagram illustrating a system environment for generating consolidated resource access control data in an electronic network, in accordance with an embodiment of the invention;

FIG. 2 provides a block diagram illustrating the entity system 200 of FIG. 1, in accordance with an embodiment of the invention;

FIG. 3 provides a block diagram illustrating an access control data generation system 300 of FIG. 1, in accordance with an embodiment of the invention;

FIG. 4 provides a block diagram illustrating the computing device system 400 of FIG. 1, in accordance with an embodiment of the invention; and FIG. 5 provides a process flow for generating consolidated resource access control data in an electronic network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which develops, maintains, and/or manages, one or more entity resources (e.g., applications, frameworks, databases, and/or the like). In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution. As used here, the term "third party entity" may refer to any third party organization that acquires licenses to the one or more entity resources associated with the entity. As described herein, a "user" may be an employee of the entity or the third party entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, an entity may allow other users of third party entities to use the one or more entity resources. However, the entity may not know which user accounts associated with the third party entities are accessing the one or more entity resources. As such, there exists a need for a system to generate consolidated access control data associated with the one or more entity resources for properly accessing the applications. The system of the present invention provides a technical solution to this problem as explained in detail below.

FIG. 1 provides a block diagram illustrating a system environment 100 for generating consolidated resource access control data in an electronic network, in accordance with an embodiment of the invention. As illustrated in FIG. 1, the environment 100 includes an access control data generation system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200 or one or more third party entities associated with the one or more third party systems 201.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that manages, maintains, and/or develops one or more entity resources (e.g., applications, frameworks, databases, or the like). In some embodiments, the one or more third party systems 201 may be any organizations that utilize the one or more entity resources provided by the entity. In one exemplary embodiment, the one or more third party entities associated with the one or more third party systems 201 acquire licenses from the entity to utilize the one or more entity resources, where the one or more entity resources are utilized by employees of the one or more third party entities to perform one or more organizational activities associates with the one or more third party entities and/or the entity.

The access control data generation system 300 is a system of the present invention for performing one or more process steps described herein. In some embodiments, the access control data generation system 300 may be an independent system. In some embodiments, the access control data generation system 300 may be a part of the entity system 200.

The access control data generation system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the access control data generation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the access control data generation system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution. In some embodiments, the entity system 200 is operated by an entity that is a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an access control data generation application 250, one or more entity applications 270, and a data repository 280. The one or more entity applications 270 may be any applications developed, supported, maintained, utilized, and/or controlled by the entity that perform one or more organizational activities. The computer-executable program code of the network server application 240, the access control data generation application 250, the one or more entity application 270 to perform certain logic, data-extraction, and data-storing functions of the entity system 200 described herein, as well as communication functions of the entity system 200. In some embodiments, other entity resources (e.g., entity frameworks, databases, or the like) may be a part of the memory device 230 (not shown).

The network server application 240, the access control data generation application 250, and the one or more entity applications 270 are configured to store data in the data repository 280 or to use the data stored in the data repository 280 when communicating through the network communication interface 210 with the access control data generation system 300, and/or the computing device system 400 to perform one or more process steps described herein. In some embodiments, the entity system 200 may receive instructions from the access control data generation system 300 via the access control data generation application 250 to perform certain operations. The access control data generation application 250 may be provided by the access control data generation system 300.

FIG. 3 provides a block diagram illustrating the access control data generation system 300 in greater detail, in accordance with embodiments of the invention. As illustrated in FIG. 3, in one embodiment of the invention, the access control data generation system 300 includes one or more processing devices 320 operatively coupled to a network communication interface 310 and a memory device 330. In certain embodiments, the access control data generation system 300 is operated by an entity, such as a financial institution. In certain embodiments, the access control data generation system 300 is operated by an entity, such as a non-financial institution. In some embodiments, the access control data generation system 300 is owned or operated by the entity of the entity system 200. In some embodiments, the access control data generation system 300 may be an independent system. In alternate embodiments, the access control data generation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the access control data generation system 300 described herein. For example, in one embodiment of the access control data generation system 300, the memory device 330 includes, but is not limited to, a network provisioning application 340, a data extraction application 350, a data parsing application 360, a consolidation application 370, an auto-populating application 380, an access control data generation application 385, and a data repository 390 comprising any data processed or accessed by one or more applications in the memory device 330. The computer-executable program code of the network provisioning application 340, the data extraction application 350, the data parsing application 360, the consolidation application 370, the auto-populating application 380, and the access control data generation application 385 may instruct the processing device 320 to perform certain logic, data-processing, and data-storing functions of the access control data generation system 300 described herein, as well as communication functions of the access control data generation system 300.

The network provisioning application 340, the data extraction application 350, the data parsing application 360, the consolidation application 370, the auto-populating application 380, and the access control data generation application 385 are configured to invoke or use the data in the data repository 390 when communicating through the network communication interface 310 with the entity system 200, and/or the computing device system 400. In some embodiments, the network provisioning application 340, the data extraction application 350, the data parsing application 360, the consolidation application 370, the auto-populating application 380, and the access control data generation application 385 may store the data extracted or received from the entity system 200, and the computing device system 400 in the data repository 390. In some embodiments, the network provisioning application 340, the data extraction application 350, the data parsing application 360, the consolidation application 370, the auto-populating application 380, and the access control data generation application 385 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touch-pad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an access control data generation application 421, and an entity application 424. These applications also typically instructions to a graphical user interface (GUI) on the display 430 that allows the user 110 to interact with the entity system 200, the access control data generation system 300, and/or other devices or systems. The memory 420 of the computing device system 400 may comprise a Short Message Service (SMS) application 423 configured to send, receive, and store data, information, communications, alerts, and the like via the wireless network 152. In some embodiments, the entity application 424 may be an online banking application. In some embodiments, the access control data generation application 421 provided by the access control data generation system 300 allows the user 110 to access the access control data generation system 300. In some embodiments, the entity application 424 provided by the entity system 200 and the access control data generation application 421 allow the user 110 to access the functionalities provided by the access control data generation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for generating consolidated resource access control data in an electronic network, in accordance with an embodiment of the invention. As shown in block 510, the system identifies one or more entity resources associated with an entity. The one or more entity resources may be any resources developed, maintained, managed, and/or hosted by an entity. The one or more entity resources may comprise software applications, frameworks, databases, cloud platforms, and/or the like which may be utilized by the entity and/or third party entities to perform one or more organizational activities. The one or more third party entities may acquire permission (e.g., license) from the entity to utilize the one or more entity resources associated with the entity. In some embodiments, the system may identify the one or more entity resources based on crawling one or more entity systems associated with the entity. In some embodiments, the system may identify the one or more entity resources based on information received from the entity systems.

As shown in block 520, the system gathers access characteristics associated with the one or more entity resources from one or more third party entity systems. The system may identify all the one or more third party entity systems that have acquired permissions from the entity to utilize the one or more entity resources by communicating with one or more entity systems associated with the entity. The system may then establish a secure communication link with the one or more third party systems and may request the one or more third party systems to send the access characteristics via the secure communication link. The access characteristics may comprise existing entity resource data, access data, type of access, user data, and/or the like that provide any information associated with access or usage of the one or more entity resources by the employees of the one or more third party entities.

As shown in block 530, the system consolidates the access characteristics gathered from the one or more third party entity systems. Consolidating the access characteristics may comprise sanitizing the data, deleting redundant information, merging information associated with access, usage, and type of the one or more entity resources.

As shown in block 540, the system parses the consolidated access characteristics, via a data parsing application, to generate parsed data. Parsing the consolidated access characteristics comprises converting the consolidated access characteristics from JSON format to a storage format accepted by the storage system. For example, if the storage system is a relational database management system, the system may convert the access characterlike in JSON format to a format accepted by the relational database management system.

As shown in block 550, the system auto-populates a matrix in a storage system based on the parsed data. In some embodiments, the matrix may be a database table in the storage system. Auto-populating the matrix comprises automatically executing one or more software codes to extract data from the consolidated access characteristics that are in non-JSON format and filling one or more columns and rows in the database table.

As shown in block 560, the system generates resource access control data associated with the one or more entity resources and the one or more third party entity systems based on auto-populated data from the matrix. The system may generate the overall resource access control data (e.g., application entitlements) based on the information in the matrix. In some embodiments, the resource access control data comprises at least one of type of access, classification of the access, existence of privilege, and provisioning information. Generation of the resource access control data in this manner eliminates any possibilities of inconsistencies.

As shown in block 570, the system implements one or more actions based on the resource access control data. The one or more actions may comprise at least one of revoking pre-authorized access to the one or more entity resources, granting new access to the one or more entity resources, and revising existing access to the one or more entity resources. In some embodiments, the system may automatically transmit the generated resource access control data to one or more entity systems. The one or more entity systems may implement the one or more actions based on the resources access control data received from the system. In some embodiments, the one or more entity systems may implement the one or more actions based on instructions received from the system of the invention.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating consolidated resource access control data in an electronic network, the system comprising:

at least one network communication interface;

at least one non-transitory storage device; and at least one processing device coupled to the at least one non-transitory storage device and the at least one network communication interface, wherein the at least one processing device is configured to:

identify one or more entity resources associated with an entity, wherein the one or more entity resources comprise software applications, frameworks, databases, and cloud platforms;

gather access characteristics associated with the one or more entity resources from one or more third party entity systems, wherein the access characteristics comprise information associated with access and usage of the one or more entity resources by users associated with the one or more third party entity systems;

consolidate the access characteristics gathered from the one or more third party entity systems;

parse the consolidated access characteristics, via a data parsing application, to generate parsed data;

auto-populate a matrix in a storage system based on the parsed data; and generate resource access control data associated with the one or more entity resources and the one or more third party entity systems based on auto-populated data from the matrix, wherein the resource access control data comprises type of access, classification of the access existence of privilege, and provisioning information.

2. The system of claim 1, wherein the at least one processing device is configured to receive the access characteristics from the one or more third party systems in a JSON format.

3. The system of claim 2, wherein parsing the consolidated access characteristics comprises converting the consolidated access characteristics from JSON format to a storage format accepted by the storage system.

4. The system of claim 1, wherein the matrix is a database table.

5. The system of claim 1, wherein the at least one processing device is further configured to implement one or more actions based on the resource access control data, wherein the one or more actions comprise at least one of:

revoking pre-authorized access to the one or more entity resources;

granting access to the one or more entity resources; and revising existing access to the one or more entity resources.

6. The system of claim 1, wherein the at least one processing device is further configured to automatically transmit the resource access control data to one or more entity systems associated with the entity.

7. A computer program product for generating consolidated resource access control data in an electronic network, the computer program product comprising a non-transitory computer-readable storage medium having computer executable instructions for causing a computer processor to perform the steps of:

identifying one or more entity resources associated with an entity, wherein the one or more entity resources comprise software applications, frameworks, databases, and cloud platforms;

gathering access characteristics associated with the one or more entity resources from one or more third party entity systems, wherein the access characteristics comprise information associated with access and usage of the one or more entity resources by users associated with the one or more third party entity systems;

consolidating the access characteristics gathered from the one or more third party entity systems;

parsing the consolidated access characteristics, via a data parsing application, to generate parsed data;

auto-populating a matrix in a storage system based on the parsed data; and generating resource access control data associated with the one or more entity resources and the one or more third party entity systems based on auto-populated data from the matrix, wherein the resource access control data comprises type of access, classification of the access existence of privilege, and provisioning information.

8. The computer program product of claim 7, wherein the computer executable instructions cause the computer processor to perform the step of receiving the access characteristics from the one or more third party systems in a JSON format.

9. The computer program product of claim 8, wherein parsing the consolidated access characteristics comprises converting the consolidated access characteristics from JSON format to a storage format accepted by the storage system.

10. The computer program product of claim 7, wherein the matrix is a database table.

11. The computer program product of claim 7, wherein the computer executable instructions cause the computer processor to perform the step of implementing one or more actions based on the resource access control data, wherein the one or more actions comprise at least one of:

revoking pre-authorized access to the one or more entity resources;

granting access to the one or more entity resources; and revising existing access to the one or more entity resources.

12. The computer program product of claim 7, wherein the computer executable instructions cause the computer processor to perform the step of automatically transmitting the resource access control data to one or more entity systems associated with the entity.

13. A computer implemented method for generating consolidated resource access control data in an electronic network, wherein the method comprises:

identifying one or more entity resources associated with an entity, wherein the one or more entity resources comprise software applications, frameworks, databases, and cloud platforms;

gathering access characteristics associated with the one or more entity resources from one or more third party entity systems, wherein the access characteristics comprise information associated with access and usage of the one or more entity resources by users associated with the one or more third party entity systems;

consolidating the access characteristics gathered from the one or more third party entity systems;

parsing the consolidated access characteristics, via a data parsing application, to generate parsed data;

auto-populating a matrix in a storage system based on the parsed data; and generating resource access control data associated with the one or more entity resources and the one or more third party entity systems based on auto-populated data from the matrix, wherein the resource access control data comprises type of access, classification of the access existence of privilege, and provisioning information.

14. The computer implemented method of claim 13, wherein the method comprises receiving the access characteristics from the one or more third party systems in a JSON format.

15. The computer implemented method of claim 14, wherein parsing the consolidated access characteristics comprises converting the consolidated access characteristics from JSON format to a storage format accepted by the storage system.

16. The computer implemented method of claim 13, wherein the matrix is a database table.

17. The computer implemented method of claim 13, wherein the method comprises implementing one or more actions based on the resource access control data, wherein the one or more actions comprise at least one of:

revoking pre-authorized access to the one or more entity resources;

granting access to the one or more entity resources; and revising existing access to the one or more entity resources.

* * * * *